United States Patent
McConville

[11] 3,723,136
[45] Mar. 27, 1973

[54] PROCESS FOR KILLING SALMONELLA IN FISH MEAL

[75] Inventor: Thomas P. McConville, Long Beach, Calif.

[73] Assignee: Westgate-California Foods, Inc., San Diego, Calif.

[22] Filed: Oct. 19, 1970

[21] Appl. No.: 81,670

[52] U.S. Cl. .................................99/158, 99/225
[51] Int. Cl. ......................A23l 3/34, A22c 25/00
[58] Field of Search ........21/58; 99/189, 7, 158, 225, 99/160, 195, 197

[56] References Cited
UNITED STATES PATENTS

| | | |
|---|---|---|
| 3,579,359 | 5/1971 | Schjolberg.............................99/195 |
| 3,097,099 | 7/1963 | Bechmann............................99/158 |
| 3,249,442 | 5/1966 | Keyes et al. ..........................99/195 |
| 3,136,642 | 6/1964 | Bachenger............................99/197 |
| 2,849,323 | 8/1958 | Micleleton ...........................99/189 |
| 3,117,832 | 1/1964 | Thomas.................................21/58 |

Primary Examiner—Norman Yudkoff
Attorney—Carl R. Brown

[57] ABSTRACT

A process for exposing fish meal to dichloromonofloromethane gas or Freon 21 gas to kill Salmonella.

10 Claims, 1 Drawing Figure

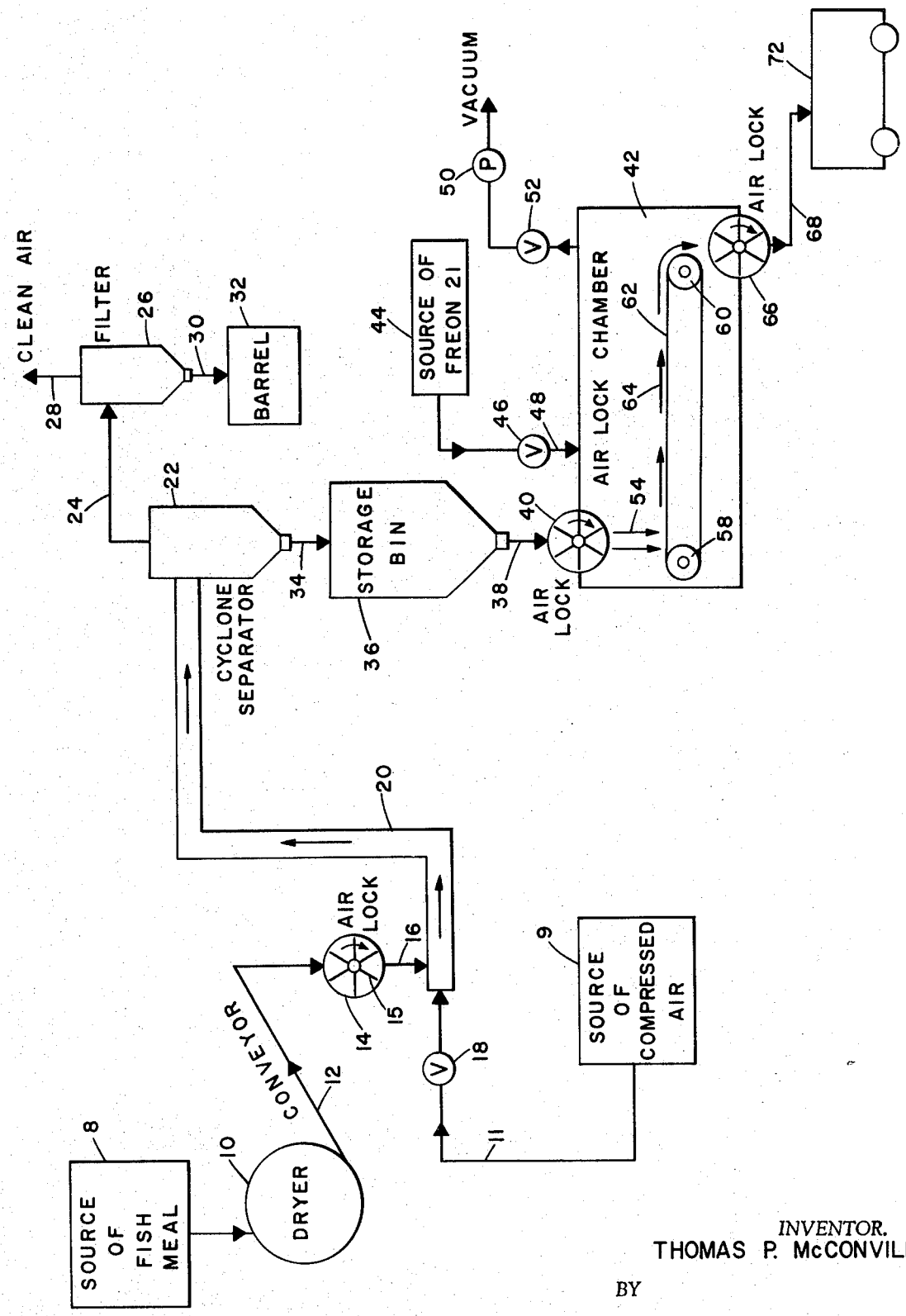

PROCESS FOR KILLING SALMONELLA IN FISH MEAL

BACKGROUND OF THE INVENTION

Fish meal, that generally comprises scrapes of fish including bones, skin, the meat of fish and other leftovers in the processing of fish, is used for many purposes including as a food product for animals and the like. In the processing, the fish meal normally comprises small particles, that are dried and sterilized in a heated dryer. The fish meal is then moved from the dryer to a storage bin. When the fish meal leaves the dryer, it is supposed to be sterilized and normally the sterilizing process does kill most bacteria. However the fish meal still usually becomes contaminated by the time it reaches the storage bin. This can result from various conditions, such as openings in the transportation system or the storage bin, contamination of the transportation equipment and other such conditions. The fish meal normally cools off in the storage bin and then is stored in the bin for several hours to several days before it is removed and transported to the point of use. Thus in the processing of fish meal, the fish meal is often sterilized of all bacteria but later becomes contaminated in the transportation to the storage bin and in storage in the storage bin. So when the fish meal is moved to the packaging or truck distribution stage, it is again contaminated.

While there are many bacteria that can cause difficulty in later use of fish meal, Salmonella is particularly bothersome because it is difficult to kill even in the sterilizing process, and it is even more difficult to keep from contaminating the fish meal in movement from the dryer and sterilizer to the storage bin and to points of delivery.

Thus it is advantageous to have a process for drying fish meal and storing the fish meal until time for distribution, and then for sterilizing the fish meal immediately prior to delivery in the manner that does not require that the fish meal be cooled thereafter. It is further advantageous to have a means for de-contaminating fish meal of Salmonella.

SUMMARY OF THE INVENTION

In the process of this invention, dried fish meal is exposed to a gas having the chemical name dichloromonofloromethane, the formula $CHCL_2F$ and the common name Freon 21. Hereinafter this gas will be referred to by its common name Freon 21. The sufficient exposure of the fish meal to Freon 21 gas will kill all Salmonella as well as other bacteria in the fish meal. In experimentation it has been established that while the blowing of gas through fish meal will kill all Salmonella in Salmonella contaminated fish meal, it is also possible to kill all salmonella in fish meal by exposing the fish meal to Freon 21 gas in a vacuum chamber for a period of at least about one-half minute. This latter process permits the disburse-ment of the Freon 21 gas into the fish meal, which passes through the vacuum chamber in a thin layer on a conveyor belt, in an efficient system operation.

This process makes it possible to efficiently process fish meal from its origination through storage and later transportation to point of use in an efficient manner that still assures the killing of all Salmonella and other bacteria at the point of transportation to the point of use. Thus the fish meal can be dryed and sterilized, moved by air to storage and stored in the storage bin for any given period of time. When it is desired to dispense the fish meal from the storage bin for transportation to point of use, the fish meal then may be passed through a Freon 21 environment in an air lock chamber, killing all Salmonella in the fish meal immediately prior to loading the fish meal in a de-contaminated transportation means.

It is therefore an object of this invention to provide a new and improved process for de-contaminating fish meal.

It is another object of this invention to provide a new and improved method for de-contaminating fish meal and especially to kill all Salmonella in fish meal.

It is another object of this invention to provide a new and improved process for drying, sterilizing, storing and distributing to points of use fish meal free of bacteria and Salmonella that contaminate the fish meal during storage.

It is another object of this invention to provide a new and improved method of processing the sterilization of fish meal by the use of Freon gas in a manner that the Freon gas is controlled in such use.

Other objects and many advantages of this invention will become more apparent upon the reading of the following detailed description and an examination of the drawing wherein like reference numerals designate like parts throughout and in which:

FIG. 1 is a schematic view of an embodiment of the process of this invention.

Referring now to the drawing, fish meal provided from any known source 8 is inserted into a dryer 10. While the dryer 10 may have any known configuration, in one exemplary embodiment it is similar to a cement kiln wherein fish meal is inserted into a long tube that is heated. The tube, which is inclined, rolls continuously causing the fish meal to be moved progressively down the tube to the exit end. The fish meal is normally dried in the dryer 10 to the point that it only has about three or four per cent moisture. For example, the fish meal may be passed through the dryer 10 for about 5 minutes at about 450° to 500° F., wherein the fish meal will be dryed and sterilized. The fish meal is then moved from the dryer 10 by a conveyor 12, that may be of the screw type, through an air lock valve 14 into pipe 20. The air lock valve 14 can have rotating vanes 15 that function in the known manner to move the fish into the air line 20 while restricting the passage of air from line 20 back through the air lock 14.

Air is supplied from a suitable source of pressurized air 9 through input line 11 and air lock seal valve 18 into pipe 20. Pipe 20, has a sufficient diameter than when it receives the dryed and sterilized fish meal through input line 16, it carries the fish meal by movement of air through pipe 20 to a cyclone storage bin 22. For example, the pipe 20 may have a diameter of approximately 15 inches and a length of approximately 500 feet and the input air supply can be about 2,200 cubic feet per minute at about atmospheric pressure. The fish meal is separated from the air in the storage bin 22 that has a conical bottom that feeds the fish meal through a suitable discharge valve and line 34 to the main storage bin 36. The air in turn moves upwardly through vent 24 and through a filter bag device 26 that removes the light and fine fish meal from the air. The clean air 28 is discharged from the filter bag, with the fine fish meal passing out discharge 30 to a barrel 32. The powderized fine fish meal in barrel 32 is either used for specific purposes or is thrown away.

The storage bin 36 comprises the main storage area for the fish meal and the fish meal normally cools in this bin. As is usually the case, the fish meal in passing from the dryer 10 through conveyor 12, air line 20, the cyclone storage bin 22 to the main storage area 36, becomes contaminated with Salmonella and possibly other bacteria. In other cases the fish meal may have been contaminated with Salmonella upon leaving the dryer 10. The fish meal is usually stored in the main storage area until it can be transported either in bulk or in suitable packages to other points of use. Since the fish meal may be stored in the storage bin for a period of several hours to several days, during this period of time the bacteria and Salmonella can multiply increasing the contamination.

In this process, prior to transportation to point of use, the fish meal is passed through a gas lock rotating valve 40 that serially passes quantities of the fish meal into the air lock chamber 42. Air lock chamber 42 is a vacuum chamber, with the vacuum being drawn by a suitable known mechanism 50 through a valve 52. When a suitable vacuum is reached, then Freon 21 gas under a pressure of for example, 12 PSI absolute, is passed into the chamber 42 to the degree that the vacuum in the chamber is about 10 inches of mercury. The fish meal is deposited from the air lock mechanism 40 onto the conveyor 62 in the direction of arrows 54 so that it spreads in a thin layer onto conveyor 62 that moves the fish meal through the air lock chamber 42 in the direction of arrows 64. The fish meal passes over the end of conveyor 62 and out an air lock passage device 66 and through a de-contaminated line 68 to a de-contaminated truck 72 for transportation to the point of use.

The conveyor belt 62 moves on rollers 58 and 60 and is powered by any suitable power means, not shown. The fish meal, is moved on the belt 62 at a degree of speed that the fish meal is in the air lock chamber for a period of at least about one-half minute. It has been found that through experimentation that an exposure time of 5 seconds is not sufficient to kill all of the Salmonella. Further an exposure time of 15 seconds was not sufficient to kill all of the Salmonella in the fish meal. However an exposure time of one-half minute resulted in the killing of all Salmonella in the fish meal. Subsequent experiments with exposure times of 1 minute, 5 minutes, 10 minutes, and 20 minutes did not increase the effect of killing all Salmonella in the fish meal. Thus the optimum time for exposure is in the order of one-half to 1 minute.

The fish meal, when deposited on the belt 62, is very porous. Thus the gas permeates the fish meal easily and the fish meal is easily spread very thinly onto the belt 62. While the belt may have a porous texture, it has a sufficiently fine texture to carry the fish meal thereon.

It has also been found possible to blow Freon 21 into the fish meal as it passes along conveyor 62 in the chamber 42, and thus achieve the killing of Salmonella. However the use of the air lock vacuum chamber provides a somewhat more efficient structure that makes the use of the Freon 21 easier to control.

In actual operation of the air lock chamber, the vacuum device 50 draws a vacuum in chamber 42 periodically and then a charge of Freon 21 gas from source 44 is inserted through line 48 into the chamber 42 periodically. Thus rather than using a continuous drawing of a vacuum and inserting of Freon 21 gas into chamber 42, this is accomplished by the periodic drawing of the vacuum and inserting a Freon 21 gas charge into the chamber 42, which permits using a smaller amount of Freon 21 gas. However it is within this invention to make the insertion and withdrawal of Freon 21 gas continuous.

Having described my invention, I now claim.

1. A process for exposing fish meal to dichloromonofloromethane gas to kill bacteria and especially Salmonella comprising the steps of,
   moving the dryed fish meal into an exposure with dichloromonofloromethane gas,
   exposing said fish meal to the dichloromonofloromethane gas for a minimum time period of 30 seconds, and
   removing said fish meal from exposure with the dichloromonofloromethane gas.

2. A process for exposing fish meal to dichloromonofloromethane gas to kill Salmonella as claimed in claim 1 characterized by said exposure being made in a chamber at a slight vacuum.

3. A process as claimed in claim 1 characterized by said exposure being in a chamber filled with dichloromonofloromethane gas at a vacuum of about ten inches of mercury.

4. A process as claimed in claim 3 including a step in said exposing step of,
   moving said fish meal in a thin layer through said chamber.

5. A process as claimed in claim 4 including the steps of,
   periodically and substantially evacuating said chamber of the dichloromonofloromethane gas, and
   recharging said substantially evacuated chamber with dichloromonofloromethane gas.

6. A process as claimed in claim 4 including the steps of,
   drying said fish meal prior to moving said fish meal into the exposure with dichloromonofloromethane gas.

7. A process as claimed in claim 6 including the step of,
   dispersing said fish meal by air prior to moving said fish meal into the exposure with the dichloromonofloromethane gas.

8. A process for exposing fish meal to dichloromonofloromethane gas to kill bacteria and especially Salmonella, comprising the steps of,
   placing fish meal into exposure with dichloromonofloromethane gas, and
   exposing said fish meal to the dichloromonofloromethane gas for a sufficient time to kill Salmonella.

9. A process for exposing fish meal to dichloromonofloromethane gas as claimed in claim 8 in which,
   said fish meal is exposed to the dichloromonofloromethane gas continuously.

10. A process of de-contaminating fish meal prior to delivery comprising the steps of, drying and sterilizing the fish meal,
storing in storage the fish meal for later use, and
exposing the fish meal to dichloromonofloromethane gas to kill bacteria and Salmonella immediately prior to delivery from said storage.

* * * * *